(12) United States Patent
Cao et al.

(10) Patent No.: US 12,480,982 B2
(45) Date of Patent: Nov. 25, 2025

(54) POWER LEVEL ACQUISITION CIRCUIT AND APPARATUS

(71) Applicant: VERTIV TECH (XI'AN) CO., LTD., Shaanxi (CN)

(72) Inventors: Honggui Cao, Xi'an (CN); Jijun Fang, Xi'an (CN); Bolang Xue, Xi'an (CN)

(73) Assignee: VERTIV TECH (XI'AN) CO., LTD., Shaanxi (CN)

( * ) Notice: Subject to any disclaimer, the term of this patent is extended or adjusted under 35 U.S.C. 154(b) by 146 days.

(21) Appl. No.: 18/270,430

(22) PCT Filed: Feb. 8, 2021

(86) PCT No.: PCT/CN2021/075960
§ 371 (c)(1),
(2) Date: Jun. 29, 2023

(87) PCT Pub. No.: WO2022/141762
PCT Pub. Date: Jul. 7, 2022

(65) Prior Publication Data
US 2024/0094270 A1    Mar. 21, 2024

(30) Foreign Application Priority Data
Dec. 31, 2020   (CN) .......................... 202011623943.1

(51) Int. Cl.
*G01R 21/06*    (2006.01)
(52) U.S. Cl.
CPC ................................. *G01R 21/06* (2013.01)

(58) Field of Classification Search
CPC ........ G01R 21/06; G01R 31/40; G01R 31/52; G01R 19/2513; G01R 21/133; G01R 1/36;
(Continued)

(56) References Cited

U.S. PATENT DOCUMENTS

2005/0182398 A1*   8/2005   Paterson ............ A61B 18/1233
                                                                 606/34
2013/0278077 A1    10/2013  Mueck
(Continued)

FOREIGN PATENT DOCUMENTS

CN     102182577 A     9/2011
CN     103378660 A     10/2013
(Continued)

OTHER PUBLICATIONS

Extended European Search Report regarding Application No. 21912536.6, dated May 28, 2024.
(Continued)

*Primary Examiner* — Judy Nguyen
*Assistant Examiner* — Robert P Alejnikov, Jr.
(74) *Attorney, Agent, or Firm* — Harness, Dickey & Pierce, P.L.C.

(57) ABSTRACT

Provided are a power level acquisition circuit and apparatus, used for solving the problem in the prior art, when conducting reinforced insulation testing, of work hour wastage and safety hazards. A power acquisition circuit comprises an AC-DC conversion unit (20), an acquisition unit (21), a processing unit (22), a power supply isolation unit (23), and (Continued)

a communication isolation unit (24); the power supply isolation unit (23) isolates the current between the power supply side of the acquisition unit (21) and the power supply side of the processing unit (22), and the communication isolation unit (24) isolates the current when the communication end of the acquisition unit (21) and the communication end of the processing unit (22) are in communication; because of the presence of the power isolation unit (23) and the communication isolation unit (24), no large current occurs on the sampling unit (21) side, eliminating the need to disconnect the sampling terminal for enhanced insulation testing, saving work hours, and reducing safety hazards.

18 Claims, 7 Drawing Sheets

(58) Field of Classification Search
CPC ....... G01R 19/22; G01R 15/18; H02M 3/335; H02M 3/33561; H02M 7/04
USPC ...................................................... 324/140 R
See application file for complete search history.

(56) References Cited

U.S. PATENT DOCUMENTS

| | | | |
|---|---|---|---|
| 2013/0328544 A1* | 12/2013 | Lee | G01R 21/00 324/76.11 |
| 2017/0346313 A1* | 11/2017 | Yao | H02J 7/0071 |
| 2019/0222126 A1* | 7/2019 | Parisi | H02M 3/33523 |
| 2019/0273443 A1* | 9/2019 | Tian | H02M 7/04 |
| 2021/0231726 A1* | 7/2021 | Du | G01R 27/025 |

FOREIGN PATENT DOCUMENTS

| | | |
|---|---|---|
| CN | 106249178 A | 12/2016 |
| CN | 106685211 A | 5/2017 |
| CN | 110967606 A | 4/2020 |
| CN | 211827556 U | 10/2020 |

OTHER PUBLICATIONS

International Search Report and Written Opinion issued in PCT/CN2021/075960, mailed Sep. 28, 2021 (with full English translation); ISA/CN.

* cited by examiner

Figure 1

Prior Art

POWER LEVEL ACQUISITION CIRCUIT AND APPARATUS

This application is a 371 U.S. National Phase of International Application No. PCT/CN2021/075960 filed on Feb. 8, 2021, which claims the priority to Chinese Patent Application No. 202011623943.1, titled "POWER ACQUISITION CIRCUIT AND APPARATUS", filed on Dec. 31, 2020 with the China National Intellectual Property Administration, which is are incorporated herein by reference in its their entirety.

FIELD

The present disclosure relates to the technical field of electricity and electronics, and in particular to a power acquisition circuit and a power acquisition apparatus.

BACKGROUND

Figure 1:
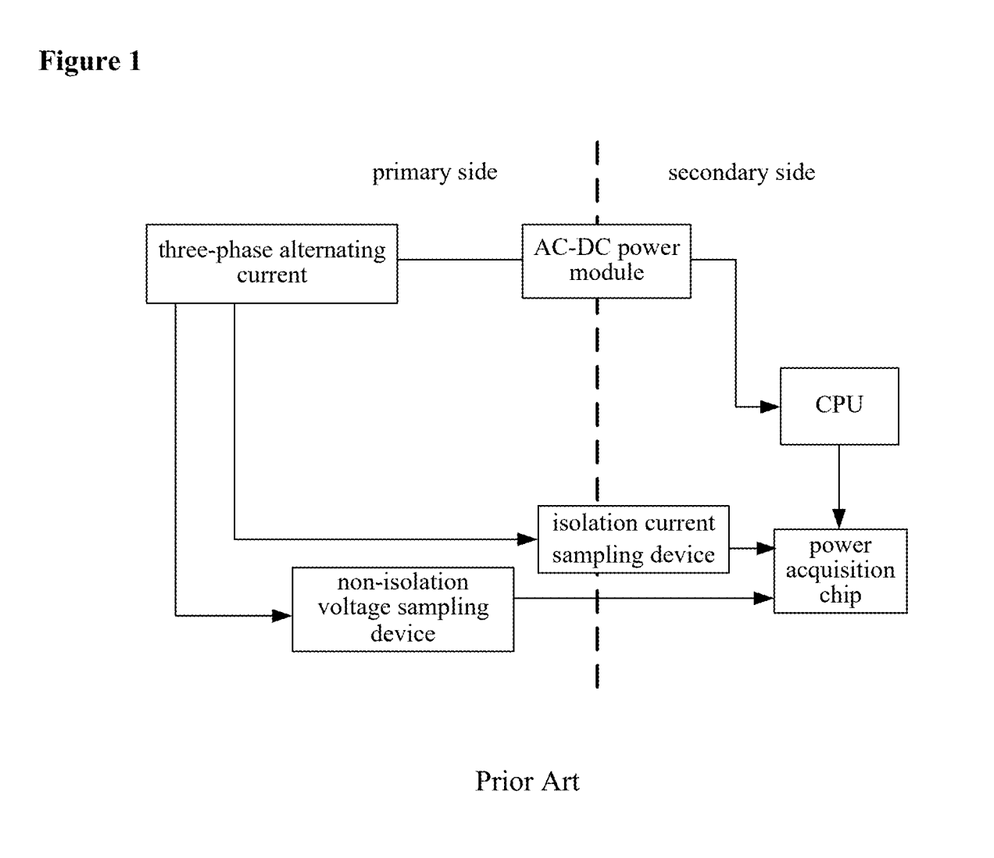
FIG. 1 is a schematic diagram of a power acquisition circuit according to the conventional technology.

The monitoring host in a data center needs to realize the integration of environment data monitoring and power acquisition. FIG. 1 shows a power acquisition circuit that is commonly used in the related field.

In the power acquisition circuit shown in FIG. 1, when a power acquisition chip performs sampling, a voltage signal is isolated with a large resistance, and a current signal is sampled by using an isolation device, such as CT (current transformer) and Rogowski coil. The power supply and the communication part share an AC-DC (Alternating Current-Direct Current) power module with the secondary side.

With this power acquisition circuit, in performing a reinforced insulation test in the production testing process, the current may increase due to the increase in voltage across the voltage sampling resistor, then the resistor may burn out due to overcurrent. Therefore, it is required to unplug the voltage sampling terminal.

Unplugging the voltage sampling terminal in the reinforced insulation test may result in wasting of working hours and risk of electric shock for production operators.

SUMMARY

According to the present disclosure, a power acquisition circuit and a power acquisition apparatus are provided, to solve the problem of waste of working hours and safety hazards in performing reinforced insulation test according to the conventional technology.

In a first aspect, a power acquisition circuit is provided according to an embodiment of the present disclosure. The power acquisition circuit includes: an AC-DC conversion unit, an acquisition unit, a processing unit, a power isolation unit and a communication isolation unit. An input terminal of the AC-DC conversion unit is connected to an alternating current power supply, and an output terminal of the AC-DC conversion unit is connected to an input terminal of the power isolation unit and a power terminal of the processing unit, for converting an alternating current to a direct current and inputting the direct current to the power isolation unit and the power terminal of the processing unit. A sampling terminal of the acquisition unit is connected to the alternating current power supply for sampling the alternating current. An output terminal of the power isolation unit is connected to an output terminal of the acquisition unit for isolating a current between the acquisition unit and the processing unit. The communication isolation unit is connected between a communication terminal of the acquisition unit and a communication terminal of the processing unit, for isolating a current when the acquisition unit and the processing unit are in communication.

In an embodiment, the power isolation unit includes a high-withstand voltage DC-DC isolation transformer and a switching circuit. The switching circuit is configured to generate a control signal based on an inputted switching signal. A first input terminal of the high-withstand voltage DC-DC isolation transformer is connected to the output terminal of the AC-DC conversion unit, a second input terminal of the high-withstand voltage DC-DC isolation transformer is connected to an output terminal of the switching circuit, and an output terminal of the high-withstand voltage DC-DC isolation transformer is connected to a power terminal of the acquisition unit, for controlling the high-withstand voltage DC-DC isolation transformer based on the control signal outputted by the switching circuit to isolate the current between the acquisition unit and the processing unit.

In an embodiment, the switching circuit includes a first resistor, a second resistor, and a switching transistor. A terminal of the first resistor serves as an input terminal of the switching circuit, and a second terminal of the first resistor is connected to a terminal of the second resistor and a base of the switching transistor. The other terminal of the second resistor is connected to an emitter of the switching transistor and is grounded. A collector of the switching transistor is connected to the second input terminal of the high-withstand voltage DC-DC isolation transformer.

In an embodiment, the power isolation unit further includes a voltage stabilizing circuit. An input terminal of the voltage stabilizing circuit is connected to the output terminal of the high-withstand voltage DC-DC isolation transformer, and an output terminal of the voltage stabilizing circuit is connected to the power terminal of the acquisition unit, for stabilizing a direct current outputted by the high-withstand voltage DC-DC isolation transformer before inputting it to the power terminal of the acquisition unit.

In an embodiment, the voltage stabilizing circuit includes a diode, a first capacitor, a third resistor, a voltage stabilizing chip, a second capacitor, a first inductor, and a second inductor. An anode of the diode is connected to a first output terminal of the high-withstand voltage DC-DC isolation transformer, and a cathode of the diode is connected to the first capacitor, the third resistor, and an input terminal of the voltage stabilizing chip. An output terminal of the voltage stabilizing chip is connected to a terminal of the second capacitor and a terminal of the first inductor. The other terminal of the first inductor is connected to the power terminal of the acquisition unit. A second output terminal of the high-withstand voltage DC-DC isolation transformer is connected to the other terminal of the first capacitor, the other terminal of the third resistor, a ground terminal of the voltage stabilizing chip, the other terminal of the second capacitor and a terminal of the second inductor. The other terminal of the second inductor is grounded.

In an embodiment, the communication isolation unit includes an optocoupler and a driving circuit. A first terminal of the optocoupler is connected to the communication terminal of the processing unit, and another terminal of the optocoupler is connected to the communication terminal of the acquisition unit. The driving circuit is configured to drive the optocoupler to operate normally based on a received trigger signal. The optocoupler is configured to, after operating normally, isolate the current when the acquisition unit and the processing unit are in communication.

In an embodiment, the communication isolation unit includes a communication isolation chip. A terminal of the communication isolation chip is connected to the communication terminal of the processing unit, and another terminal of the communication isolation chip is connected to the communication terminal of the acquisition unit, wherein the terminal of the communication isolation chip and the another terminal of the communication isolation chip are located on different sides of an isolation zone of the communication isolation chip.

In an embodiment, the acquisition unit includes an acquisition chip, a voltage divider resistor, a non-isolation current acquisition unit, and a sampling resistor. A terminal of the voltage divider resistor is connected to a phase line of the alternating current, and the other terminal of the voltage divider resistor is connected to a voltage acquisition terminal of the acquisition chip, for acquiring a voltage. A terminal of the non-isolation current acquisition unit is connected to the phase line of the alternating current, another terminal of the non-isolation current acquisition unit is connected to a terminal of the sampling resistor, and the other terminal of the sampling resistor is connected to a current acquisition terminal of the acquisition chip, for acquiring a current.

In an embodiment, the power acquisition circuit further includes a direct current-direct current (DC-DC) conversion circuit. An input terminal of the DC-DC conversion circuit is connected to the output terminal of the AC-DC conversion unit, and an output terminal of the DC-DC conversion circuit is connected to the power terminal of the processing unit, for performing a voltage reduction processing on the direct current outputted from the AC-DC conversion unit to obtain a first direct current for which the voltage has been reduced.

In an embodiment, the power isolation unit is further configured to control, by means of a switching circuit, the high-withstand voltage DC-DC isolation transformer to perform a voltage reduction processing on the direct current outputted from the AC-DC conversion unit to obtain a second direct current for which the voltage has been reduced.

In a second aspect, a power acquisition apparatus is provided according to an embodiment of the present disclosure. The power acquisition apparatus includes the power acquisition circuit in the first aspect.

The present disclosure has the following beneficial effects.

According to the embodiments of the present disclosure, the power isolation unit isolates the current between the power terminal of the acquisition unit and the power terminal of the processing unit, and the communication isolation unit isolates the current when the communication terminal of the acquisition unit and the communication terminal of the processing unit are in communication. With the power isolation unit and communication isolation unit, no large current will occur at the sampling unit side in performing the reinforced insulation test in the production testing process. As such, the reinforced insulation test can be performed without unplugging the sampling terminal, and thereby saving working hours and reducing safety hazards.

BRIEF DESCRIPTION OF THE DRAWINGS

In order to clearly describe the technical solutions in the embodiments of the present disclosure, drawings referred to in the description of the embodiments are briefly described hereinafter. It is apparent that the drawings described below merely illustrate some of the embodiments of the present disclosure, and those skilled in the art may obtain additional drawings based on these drawings without any creative effort.

DETAILED DESCRIPTION

In order to make the objectives, technical solutions, and advantages of the present disclosure more clear, the present disclosure is described in detail below in conjunction with accompanying drawings. Apparently, the described embodiments are only some embodiments, rather than all embodiments, of the present disclosure. Based on the embodiments of the present disclosure, all the other embodiments obtained by those skilled in the art without creative working will fall within the scope of the present disclosure.

In the embodiments of the present disclosure, insulation test is performed on a primary side and a secondary side. Voltage is increased step-by-step between the primary side and the secondary side, and a leakage current is detected. When the voltage is increased to a certain level, if the detected leakage current is smaller than a current value specified in a standard, the insulation test is passed. The insulation test includes a basic insulation test and a reinforced insulation test. A withstand voltage of the reinforced insulation test is greater than that of the basic insulation test, and is usually 4000V with a direct current.

Galvanic isolation refers to a method for avoiding a current flowing from an area to another area in a circuit, that is, no direct path for current flow is established between two areas. Although the current cannot flow directly, energy or information may still be transmitted in other manners, for example through electromagnetic induction or electromagnetic waves, or in the optical, acoustic, or mechanical manners.

For the power acquisition unit, it is usually required to unplug the voltage sampling terminal to perform the reinforced insulation test. However, unplugging the voltage sampling terminal will result in wasting of working hours and safety hazards for production operators.

Figure 2:
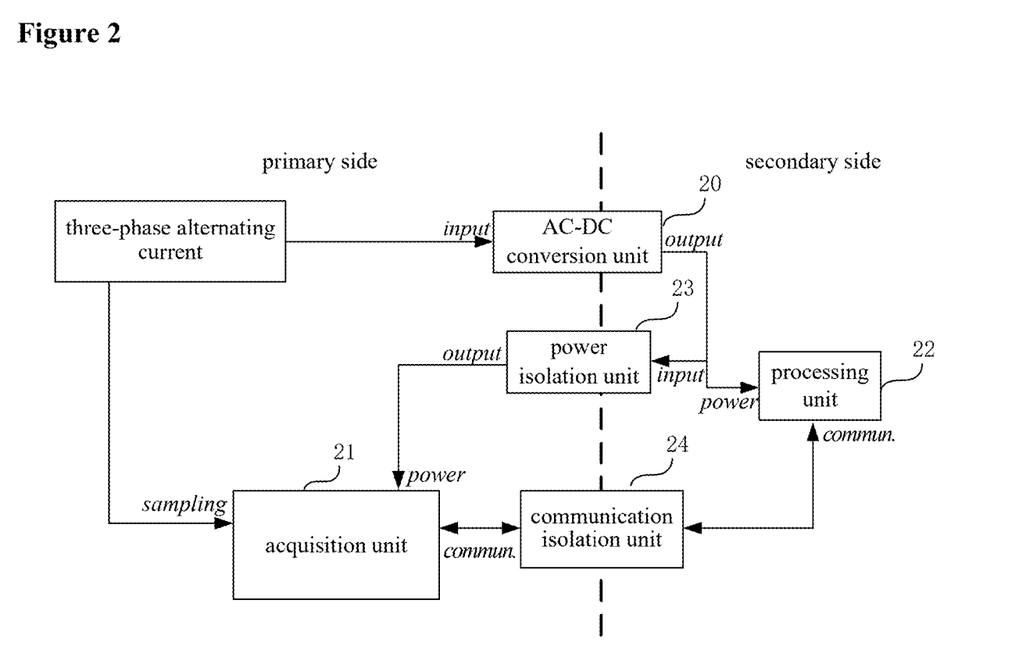
FIG. 2 is a schematic diagram of a power acquisition circuit according to an embodiment of the present disclosure.

To solve the above problems, a power acquisition circuit is provided according to an embodiment of the present disclosure. As shown in FIG. 2, the power acquisition circuit includes an AC-DC conversion unit 20, an acquisition unit 21, a processing unit 22, a power isolation unit 23 and a communication isolation unit 24.

An input terminal of the AC-DC conversion unit 20 is connected to an alternating current power supply, and an output terminal of the AC-DC conversion unit 20 is connected to an input terminal of the power isolation unit 23 and a power terminal of the processing unit 22, for converting an alternating current to a direct current and inputting the direct current to the power isolation unit 23 and the power terminal of the processing unit 22.

A sampling terminal of the acquisition unit 21 is connected to the alternating current power supply, for sampling the alternating current.

An output terminal of the power isolation unit 23 is connected to an output terminal of the acquisition unit 21, for isolating a current between the acquisition unit 21 and the processing unit 22.

The communication isolation unit 24 is connected between a communication terminal of the acquisition unit 21 and a communication terminal of the processing unit 22, for isolating a current when the acquisition unit 21 and the processing unit 22 are in communication.

According to the embodiment of the present disclosure, the power isolation unit is used to isolate the current between the power terminal of the acquisition unit and the power terminal of the processing unit, and the communication isolation unit is used to isolate the current when the communication terminal of the acquisition unit and the communication terminal of the processing unit are in communication. Since electric isolation is implemented by using the power isolation unit and the communication isolation unit, it is unnecessary to unplug the sampling terminal when performing the insulation test in the production testing process, and thereby saving working hours and reducing safety hazards.

Figure 3:
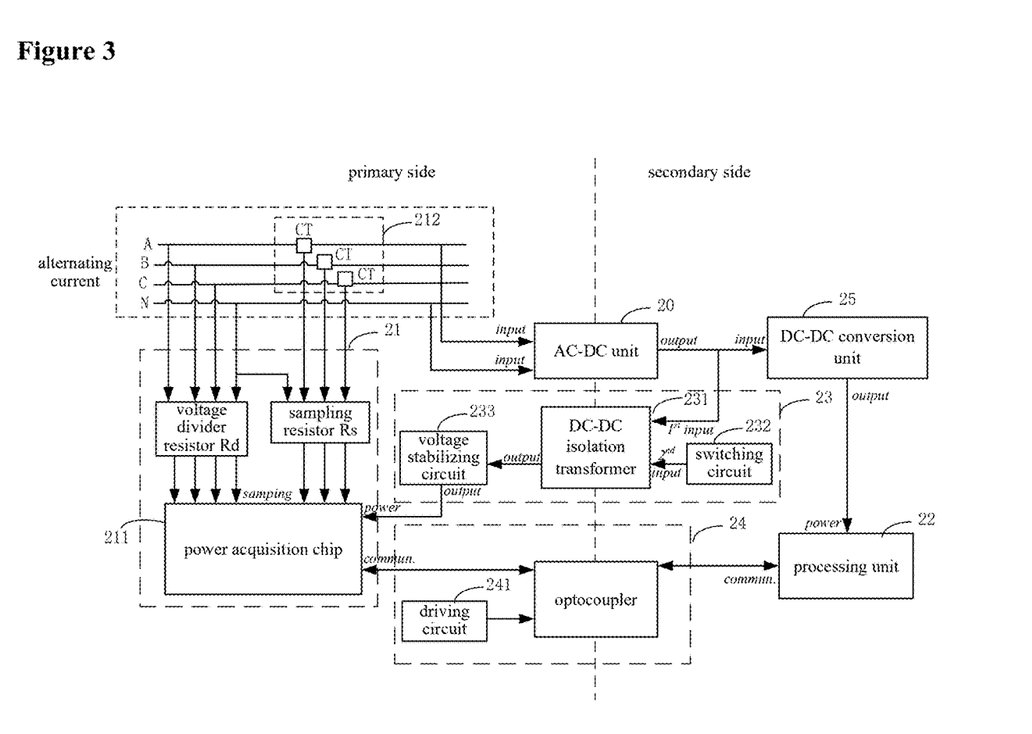
FIG. 3 is a schematic diagram of an acquisition unit according to an embodiment of the present disclosure.

In implementation, the alternating current may be a three-phase alternating current. The acquisition may include current acquisition and voltage acquisition. As shown in FIG. 3, the acquisition unit 21 includes an acquisition chip 211, a voltage divider resistor Rd, a non-isolation current acquisition unit 212, and a sampling resistor Rs.

A terminal of the voltage divider resistor Rd is connected to phase lines of the alternating current, and the other terminal of the voltage divider resistor Rd is connected to a voltage acquisition terminal of the acquisition chip 211, for acquiring a voltage.

A terminal of the non-isolation current acquisition unit 212 is connected to the phase lines of the alternating current, another terminal of the non-isolation current acquisition unit 212 is connected to a terminal of the sampling resistor Rs, and the other terminal of the sampling resistor Rs is connected to a current acquisition terminal of the acquisition chip 212, for acquiring a current.

The non-isolation current acquisition unit 212 may be a CT.

In the embodiments of the present disclosure, the processing unit 22 may be a CPU (Central Processing Unit).

An operation voltage is required so that the acquisition chip and the CPU may operate normally. The AC-DC conversion unit 20 converts an alternating current to a direct current, and then provides an operation voltage for the acquisition chip and the CPU. Since the primary side is a high-voltage region and the secondary side is a low-voltage region, it is necessary to perform electric isolation between the primary side and the secondary side. Therefore, a power isolation unit 23 is connected between the power terminal of the acquisition chip and the power terminal of the CPU in order to prevent a current from flowing between the primary side and the secondary side.

As shown in FIG. 3, the power isolation unit 23 may include a high-withstand voltage DC-DC isolation transformer 231 and a switching circuit 232. The switching circuit 232 is configured to generate a control signal based on an inputted switching signal. A first input terminal of the high-withstand voltage DC-DC isolation transformer 231 is connected to the output terminal of the AC-DC conversion unit 20, a second input terminal of the high-withstand voltage DC-DC isolation transformer 231 is connected to an output terminal of the switching circuit 232, and an output terminal of the high-withstand voltage DC-DC isolation transformer 231 is connected to a power terminal of the acquisition unit 21, for controlling the high-withstand voltage DC-DC isolation transformer 231 based on the control signal outputted by the switching circuit 232 to isolate the current between the acquisition unit and the processing unit.

In implementation, in order that the voltage outputted by the high-withstand voltage DC-DC isolation transformer may be stably inputted into the acquisition chip, the power isolation unit may further include a voltage stabilizing circuit. As shown in FIG. 3, an input terminal of the voltage stabilizing circuit 233 is connected to the output terminal of the high-withstand voltage DC-DC isolation transformer 231, an output terminal of the voltage stabilizing circuit 233 is connected to the power terminal of the acquisition unit 21, for stabilizing a direct current outputted by the high-withstand voltage DC-DC isolation transformer 231 before inputting it to the power terminal of the acquisition unit 21.

Hereafter, the high-withstand voltage DC-DC isolation transformer 231, the switching circuit 232 and the voltage stabilizing circuit 233 in the embodiments of the present disclosure are described in detail.

Figure 4:
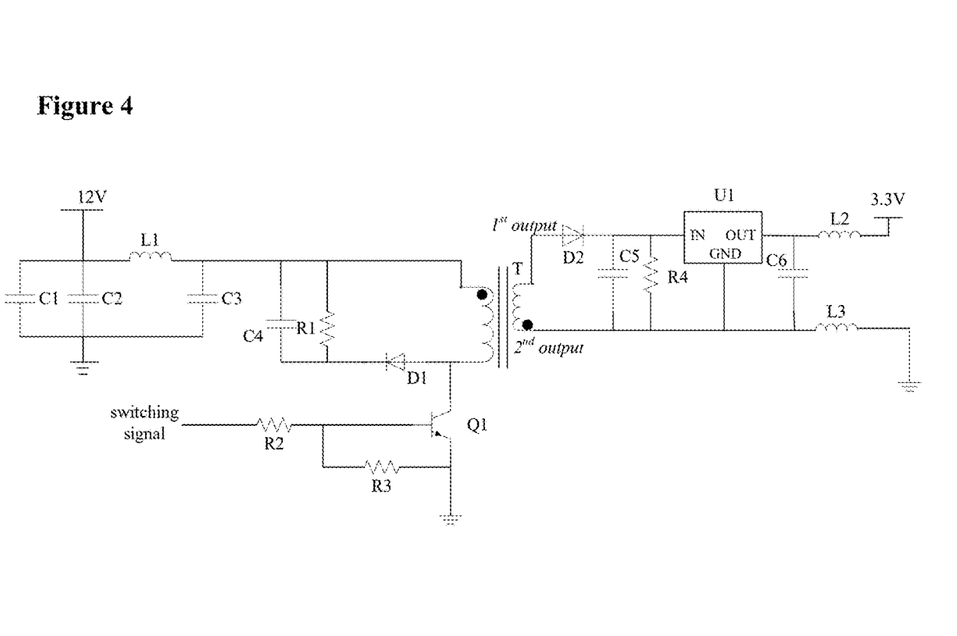
FIG. 4 is a schematic diagram of a power isolation unit according to an embodiment of the present disclosure.

FIG. 4 shows a circuit schematic diagram of a power isolation unit according to an embodiment of the present disclosure. It can be seen from FIG. 4 that the high-withstand voltage DC-DC isolation transformer 231, i.e., the high-withstand voltage DC-DC isolation transformer T in FIG. 4, includes a primary winding and a secondary winding.

As shown in FIG. 4, the switching circuit 232 includes a resistor R2, a resistor R3, and a switching transistor Q1. A terminal of the resistor R2 serves as an input terminal of the switching circuit 232, and the other terminal of the resistor R2 is connected to a terminal of the resistor R3 and a base of the switching transistor Q1. The other terminal of the resistor R3 is connected to an emitter of the switching transistor Q1 and is grounded. A collector of the switching transistor Q1 is connected to the second input terminal of the high-withstand voltage DC-DC isolation transformer T.

In implementation, the switching circuit receives a switching signal that may be triggered by the CPU. The switching signal may be at a high level, and when the high-level signal is inputted to the switching circuit, the switching transistor Q1 is turned on. The switching signal may be at a low level, and when the low-level signal is inputted to the switching circuit, the switching transistor Q1 is turned off.

As shown in FIG. 4, the voltage stabilizing circuit 233 includes a diode D2, a capacitor C5, a resistor R4, a voltage stabilizing chip U1, a capacitor C6, an inductor L2, and an inductor L3. An anode of the diode D2 is connected to a first output terminal of the high-withstand voltage DC-DC isolation transformer T, and a cathode of the diode D2 is connected to the capacitor C5, the resistor R4, and an input terminal of the voltage stabilizing chip U1. An output terminal of the voltage stabilizing chip U1 is connected to a terminal of the capacitor C6 and a terminal of the inductor L2. The other terminal of the inductor L2 is connected to the power terminal of the acquisition unit 21. A second output terminal of the high-withstand voltage DC-DC isolation transformer T is connected to the other terminal of the capacitor C5, the other terminal of the resistor R4, a ground terminal of the voltage stabilizing chip U1, the other terminal of the capacitor C6, and a terminal of the inductor L3. The other terminal of the inductor L3 is grounded.

It is noted that the withstand voltage value of the high-withstand voltage DC-DC isolation transformer is greater than or equal to 4000V in the embodiments of the present disclosure, and the high-withstand voltage DC-DC isolation transformer is a small high-withstand voltage DC-DC isolation transformer.

The operation of the voltage stabilizing circuit 233 is described as follows.

When Q1 is turned on, the primary inductance current of the high-withstand voltage DC-DC isolation transformer T increases, at this time the output diode D2 is turned off due to the dotted terminal on the secondary side. The high-withstand voltage DC-DC isolation transformer stores energy, and the load R4 is powered by the output capacitor C5. When the switching transistor Q1 is turned off, the primary inductance voltage of the high-withstand voltage DC-DC isolation transformer T is reversed, at this time the output diode D2 is turned on. The energy stored in the high-withstand voltage DC-DC isolation transformer T is supplied to the load R4 via the output diode D2, and the capacitor C5 is charged to supplement the energy lost just now.

In the above process, the inductor L2 is used for filtering, and the capacitor C6 and the inductor L3 are used for filtering.

As shown in FIG. 4, the power isolation circuit may further include a capacitor C1, a capacitor C2, a capacitor C3, a capacitor C4, a resistor R1, an inductor L1, and a diode D1.

A terminal of the capacitor C1, a terminal of the capacitor C2, and a terminal of the inductor L1 are connected to the power supply 12V. The other terminal of the inductor L1 is connected to a terminal of the capacitor C3, a terminal of the capacitor C4, a terminal of the resistor R1, and the first input terminal of the isolation transformer. The other terminal of the capacitor C1, the other terminal of the capacitor C2, and the other terminal of the capacitor C3 are grounded. The other terminal of the capacitor C4 is connected to the other terminal of the resistor R1 and a cathode of the diode D1. An anode of the diode D1 is connected to the second input terminal of the high-withstand voltage DC-DC isolation transformer.

The capacitor C1 is an energy storage element. The capacitor C2, the capacitor C3, and the inductor L1 are used for filtering. The capacitor C4, the resistor R1, and the diode D1 are used for protecting the switching transistor Q1.

In an alternative embodiment, the power isolation unit is further configured to control, by means of a switching circuit, the high-withstand voltage DC-DC isolation transformer to perform a voltage reduction processing on the direct current outputted from the AC-DC conversion unit to obtain a second direct current for which the voltage has been reduced.

For example, a voltage of 12V outputted by the AC-DC conversion unit is reduced to 3.3V, and then is supplied to the acquisition chip.

If a voltage of 12V is outputted by the AC-DC conversion unit and the power supply voltage to the CPU is 3.3V, the acquisition unit according to the embodiments of the present disclosure, as shown in FIG. 3, may further include a DC-DC conversion circuit 25. That is, the 12V voltage outputted by AC-DC conversion unit 25 is reduced to 3.3V and supplied to the CPU. Specifically, the DC-DC conversion circuit 25 may be a buck circuit composed of a buck chip.

Specifically, an input terminal of the DC-DC conversion circuit is connected to the output terminal of the AC-DC conversion unit, an output terminal of the DC-DC conversion circuit is connected to the power terminal of the processing unit, for performing a voltage reduction processing on the direct current outputted from the AC-DC conversion unit to obtain a first direct current for which the voltage has been reduced and which powers the processing unit.

Figure 5:
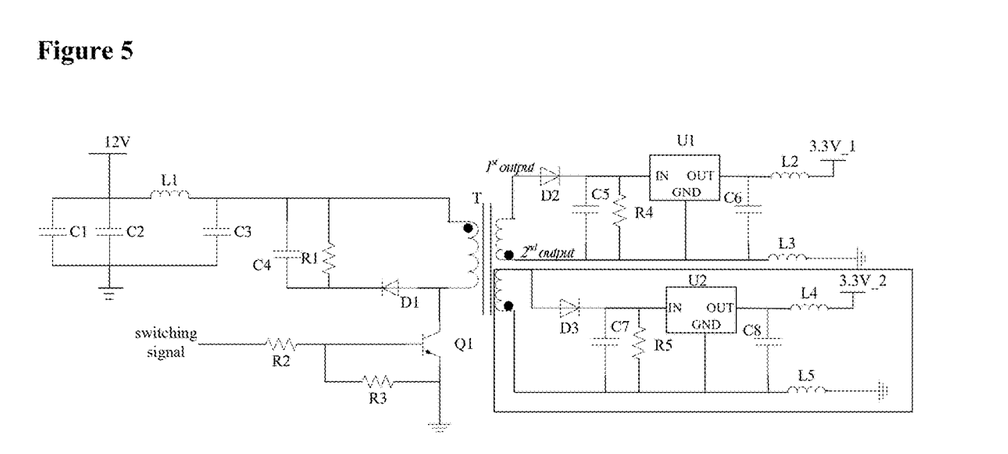
FIG. 5 is a schematic diagram of a power isolation unit according to another embodiment of the present disclosure.

In implementation, two three-phase currents may be acquired, and therefore it is necessary for the power isolation unit to output two 3.3V voltages. FIG. 5 shows a schematic diagram of a power isolation unit according to another embodiment of the present disclosure. Compared to FIG. 4, the circuit in the dashed box in FIG. 5 is newly added. It can be seen from FIG. 5 that the voltage stabilizing circuit outputs two voltages of 3.3V.

The working principle of the circuitry in FIG. 5 may be similar to that of the circuitry in FIG. 4, and is not repeated herein.

The communication isolation unit according to the embodiments of the present disclosure may include an optocoupler and a driving circuit. As shown in FIG. 3, a first terminal of the optocoupler is connected to the communication terminal of the processing unit, and another terminal of the optocoupler is connected to the communication terminal of the acquisition unit.

The driving circuit 241 is configured to drive the optocoupler to operate normally based on a received trigger signal.

The optocoupler is configured to, after operating normally, isolate the current when the acquisition unit and the processing unit are in communication.

The communication isolation unit according to the embodiments of the present disclosure is described below with reference to embodiments.

Figure 6:
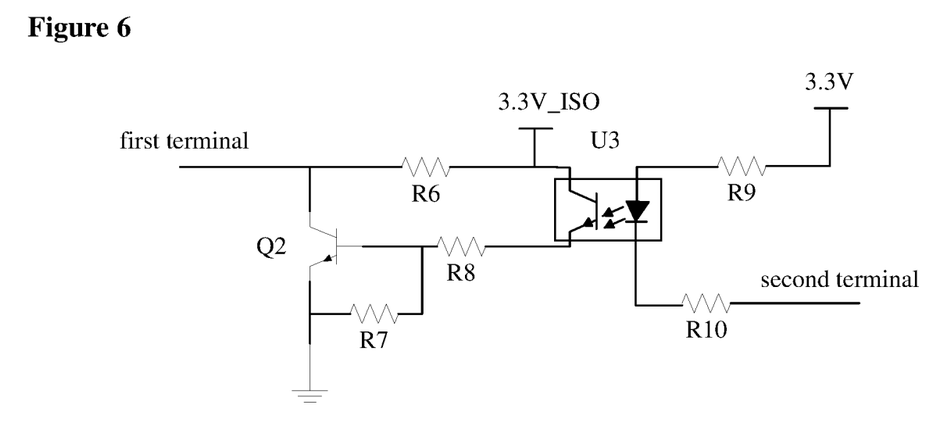
FIG. 6 is a schematic diagram of a communication isolation unit according to an embodiment of the present disclosure.

FIG. 6 shows a schematic diagram of a communication isolation unit according to an embodiment of the present disclosure. As shown in FIG. 6, the communication isolation unit includes a resistor R6, a resistor R7, a resistor R8, a resistor R9, a resistor R10, a switching transistor Q2, and an optocoupler U3.

A terminal of the resistor R9 is connected to a 3.3V power supply voltage (that is, power supply voltage before isolation, 3.3V shown in FIG. 6) which is obtained based on the DC voltage converted by the AC-DC conversion unit. The other terminal of the resistor R9 is connected to a first input terminal of the optocoupler U3. A second input terminal of the optocoupler U3 is connected to a terminal of the resistor R10. A first output terminal of the optocoupler U3 and a terminal of the resistor R6 are connected to a 3.3V power supply voltage (that is, power supply voltage after isolation, 3.3V_ISO shown in FIG. 6) which is obtained after isolation by the communication isolation unit. A second output terminal of the optocoupler U3 is connected to a terminal of the resistor R8. The other terminal of the resistor R10 serves as the second terminal of the communication isolation unit and is connected to the processing unit. A base of the switching transistor Q2 is connected to the other terminal of the resistor R8 and a terminal of the resistor R7. A collector of the switching transistor Q2 is connected to the other terminal of the resistor R6, serves as the first terminal of the communication isolation unit, and is connected to the acquisition unit. An emitter of the switching transistor Q2 is connected to the other terminal of the resistor R7 and is grounded.

It is noted that R9 and R10 in FIG. 6 forms a driving circuit.

Figure 7:
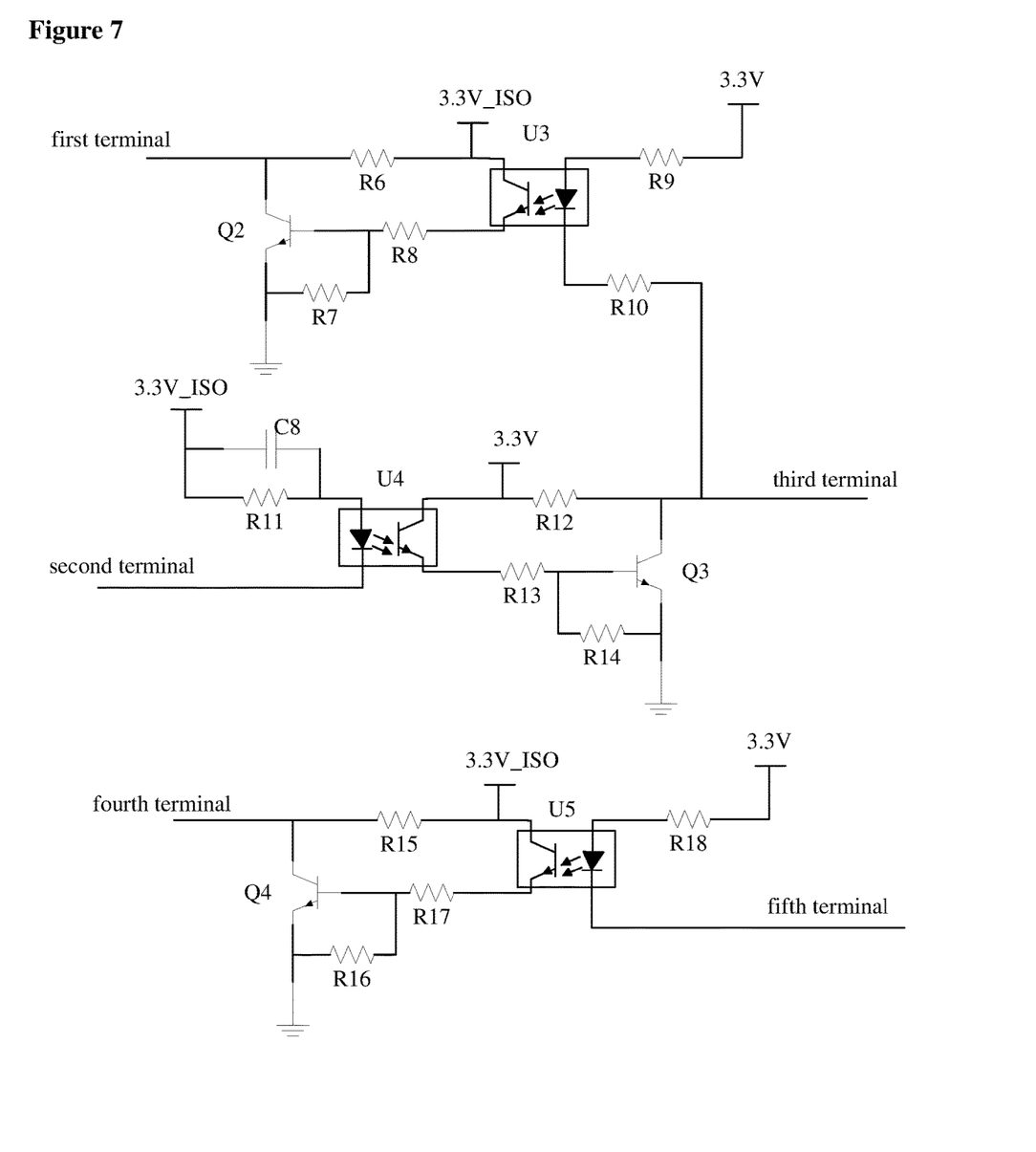
FIG. 7 is a schematic diagram of a communication isolation unit according to another embodiment of the present disclosure.

In implementation, I²C chips may be used for communication. Therefore, the communication isolation unit may be designed with a structure as shown in FIG. 7. The working principle of the circuitry may be similar to the description of the circuitry shown in FIG. 6, and is not repeated herein.

It is noted that since the SDA (Serial Data Line) for I²C signals is bidirectional, two optocouplers are needed, that is, the optocoupler U3 and the optocoupler U4 shown in FIG. 7. The optocoupler U5 is used for current isolation in transmitting a SCL (Serial Clock Line) signal.

In FIG. 7, a first terminal and a second terminal are connected to an SDA of the acquisition unit, a third terminal is connected to an SDA of the processing unit, a fourth terminal is connected to an SCL of the acquisition unit, and a fifth terminal is connected to an SCL of the processing unit.

In FIGS. 7, R9 and R10 form a driving circuit for the optocoupler U3, R11 forms a driving circuit for the optocoupler U4, and R18 forms a driving circuit for the optocoupler U5.

Figure 8:
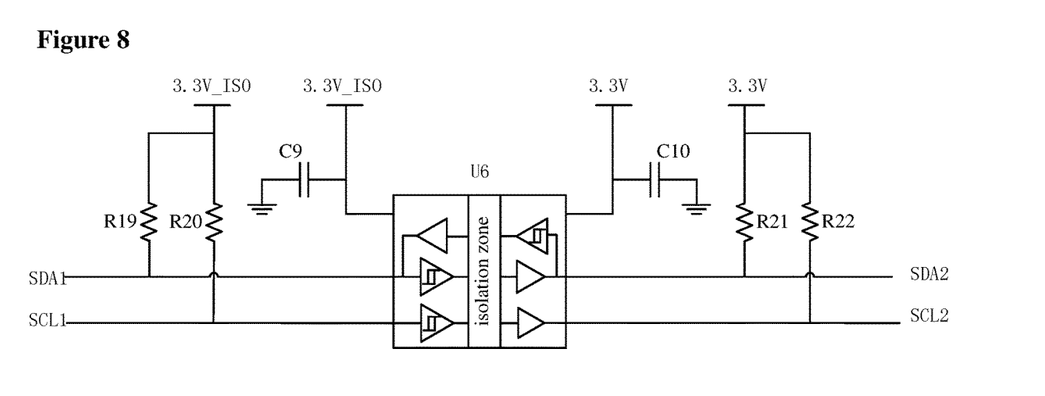
FIG. 8 is a schematic diagram of a communication isolation unit according to another embodiment of the present disclosure.

In a possible implementation, as shown in FIG. 8, the communication isolation unit may further include a communication isolation chip U6 which includes an isolation zone. SDA1 and SCL1 are arranged on one side of the isolation zone, and SDA2 and SCL2 are arranged on the other side of the isolation zone. SDA1 is connected to the communication terminal of the acquisition unit. SCL1 is connected to a clock signal terminal of the acquisition unit. SDA2 is connected to the communication terminal of the processing unit. SCL2 is connected to a clock signal terminal of the processing unit.

Specifically, the communication isolation unit further includes a resistor R19, a resistor R20, a resistor R21, a resistor R22, a capacitor C9, and a capacitor C10. The connection relationships of the components in the communication isolation unit are described below with reference to FIG. 8.

A terminal of the resistor R19 is connected to a terminal of the resistor R20 and an isolated power supply voltage of 3.3V (3.3V_ISO shown in FIG. 8), the other terminal of the resistor R19 is connected to SDA1. The other terminal of the resistor R20 is connected to SCL1. A terminal of the capacitor C9 is connected to 3.3V_ISO and a power terminal on one side of the isolation zone, and the other terminal of the capacitor C9 is grounded. A ground terminal on one side of the isolation zone is grounded. A terminal of the resistor R21 is connected to a terminal of the resistor R22 and a power supply voltage of 3.3V before isolation (3.3V shown in FIG. 8), and the other terminal of the resistor R21 is connected to SDA2. The other terminal of the resistor R22 is connected to SCL2. A terminal of the capacitor C10 is connected to 3.3V_ISO and a power terminal on the other side of the isolation zone, and the other terminal of the capacitor C10 is grounded. A ground terminal on the other side of the isolation zone is grounded.

The volume of the communication isolation chip is small, the communication isolation chip therefore occupies a small space on the printed circuit board (PCB), which may reduce the size of the PCB and reduce costs.

The present disclosure has been described with reference to flowcharts and/or block diagrams that illustrate the method, device (system) and/or computer program product according to the embodiments of the present disclosure. It should be understood that a single block and a combination of blocks in the flowcharts and/or block diagrams may be implemented by computer program instructions. The computer program instructions may be provided to a processor of a general-purpose computer or a specialized computer and/or other programmable data processing device to generate a machine, so that a method for performing the functions/operations specified in the flowcharts and/or block diagrams is generated by the instructions executed by the processor of the computer and/or other programmable data processing device.

Accordingly, the present disclosure may be implemented by hardware and/or software (including firmware, resident software, microcode, and the like.). Furthermore, the present disclosure may be in a form of computer program product that may be used by a computer or stored on a computer readable storage medium. The computer program product includes computer usable or computer readable program code implemented in a medium, which is to be used by or in conjunction with an instruction execution system. In the context of the present disclosure, a computer-usable or computer-readable medium may be any medium that may contain, store, communicate, or transmit programs that are to be used by or in conjunction with an instruction execution system, apparatus, or device.

Apparently, those skilled in the art may make various modifications and variations to the present disclosure without departing from the principle of the present disclosure. If these modifications and variations fall within the scope of the claims and equivalents thereof, these modifications and variations are intended to be included in the present disclosure.

The invention claimed is:

1. A power acquisition circuit, characterized in comprising:
   an alternating current-direct current (AC-DC) conversion unit;
   an acquisition unit;
   a processing unit;
   a power isolation unit; and
   a communication isolation unit, wherein
   an input terminal of the AC-DC conversion unit is connected to an alternating current power supply, and an output terminal of the AC-DC conversion unit is connected to an input terminal of the power isolation unit and a power terminal of the processing unit, for converting an alternating current to a direct current and inputting the direct current to the power isolation unit and the power terminal of the processing unit;
   a sampling terminal of the acquisition unit is connected to the alternating current power supply for sampling the alternating current;
   an output terminal of the power isolation unit is connected to a power terminal of the acquisition unit for isolating a current between the acquisition unit and the processing unit; and
   the communication isolation unit is connected between a communication terminal of the acquisition unit and a communication terminal of the processing unit for isolating a current when the acquisition unit and the processing unit are in communication,
   wherein
   the acquisition unit comprises an acquisition chip, a voltage divider resistor, a non-isolation current acquisition unit, and a sampling resistor,
   a terminal of the voltage divider resistor is connected to a phase line of the alternating current, and the other terminal of the voltage divider resistor is connected to a voltage acquisition terminal of the acquisition chip, for acquiring a voltage, and a terminal of the non-isolation current acquisition unit is connected to the phase line of the alternating current, another terminal of the non-isolation current acquisition unit is connected to a terminal of the sampling resistor, and the other terminal of the sampling resistor is connected to a current acquisition terminal of the acquisition chip, for acquiring a current.

2. The power acquisition circuit according to claim 1, characterized in that the power isolation unit comprises a high-withstand voltage direct current-direct current (DC-DC) isolation transformer and a switching circuit, wherein the switching circuit is configured to generate a control signal based on an inputted switching signal; and a first input terminal of the high-withstand voltage DC-DC isolation transformer is connected to the output terminal of the AC-DC conversion unit, a second input terminal of the high-withstand voltage DC-DC isolation transformer is connected to an output terminal of the switching circuit, and an output terminal of the high-withstand voltage DC-DC isolation transformer is connected to a power terminal of the acquisition unit, for controlling the high-withstand voltage DC-DC isolation transformer based on the control signal outputted by the switching circuit to isolate the current between the acquisition unit and the processing unit.

3. The power acquisition circuit according to claim 2, characterized in that the switching circuit comprises a first resistor, a second resistor, and a switching transistor, wherein a terminal of the first resistor serves as an input terminal of the switching circuit, and a second terminal of the first resistor is connected to a terminal of the second resistor and a base of the switching transistor;

the other terminal of the second resistor is connected to an emitter of the switching transistor and is grounded; and a collector of the switching transistor is connected to the second input terminal of the high-withstand voltage DC-DC isolation transformer.

4. The power acquisition circuit according to claim 2, characterized in that the power isolation unit further comprises a voltage stabilizing circuit, wherein an input terminal of the voltage stabilizing circuit is connected to the output terminal of the high-withstand voltage DC-DC isolation transformer, and an output terminal of the voltage stabilizing circuit is connected to the power terminal of the acquisition unit, for stabilizing a direct current outputted by the high-withstand voltage DC-DC isolation transformer before inputting it to the power terminal of the acquisition unit.

5. The power acquisition circuit according to claim 4, characterized in that the voltage stabilizing circuit comprises a diode, a first capacitor, a third resistor, a voltage stabilizing chip, a second capacitor, a first inductor, and a second inductor, wherein an anode of the diode is connected to a first output terminal of the high-withstand voltage DC-DC isolation transformer, and a cathode of the diode is connected to the first capacitor, the third resistor, and an input terminal of the voltage stabilizing chip;

an output terminal of the voltage stabilizing chip is connected to a terminal of the second capacitor and a terminal of the first inductor;

the other terminal of the first inductor is connected to the power terminal of the acquisition unit;

a second output terminal of the high-withstand voltage DC-DC isolation transformer is connected to the other terminal of the first capacitor, the other terminal of the third resistor, a ground terminal of the voltage stabilizing chip, the other terminal of the second capacitor, and a terminal of the second inductor; and the other terminal of the second inductor is grounded.

6. The power acquisition circuit according to claim 1, characterized in that the communication isolation unit comprises an optocoupler and a driving circuit, wherein a first terminal of the optocoupler is connected to the communication terminal of the processing unit, and another terminal of the optocoupler is connected to the communication terminal of the acquisition unit;

the driving circuit is configured to drive the optocoupler to operate normally, based on a received trigger signal; and the optocoupler is configured, after operating normally, isolate the current when the acquisition unit and the processing unit are in communication.

7. The power acquisition circuit according to claim 1, characterized in that the communication isolation unit comprises a communication isolation chip, wherein a terminal of the communication isolation chip is connected to the communication terminal of the processing unit, and another terminal of the communication isolation chip is connected to the communication terminal of the acquisition unit, wherein the terminal of the communication isolation chip and the another terminal of the communication isolation chip are located on different sides of an isolation zone of the communication isolation chip.

8. The power acquisition circuit according to claim 1, characterized in further comprising a direct current-direct current (DC-DC) conversion circuit, wherein an input terminal of the DC-DC conversion circuit is connected to the output terminal of the AC-DC conversion unit, and an output terminal of the DC-DC conversion circuit is connected to the power terminal of the processing unit, for performing a voltage reduction processing on the direct current outputted from the AC-DC conversion unit to obtain a first direct current for which the voltage has been reduced.

9. The power acquisition circuit according to claim 8, characterized in that the power isolation unit is further configured to:

control, by means of the switching circuit, the high-withstand voltage DC-DC isolation transformer to perform a voltage reduction processing on the direct current outputted from the AC-DC conversion unit to obtain a second direct current for which the voltage has been reduced.

10. A power acquisition apparatus, characterized in comprising a power acquisition circuit which comprises:

an alternating current-direct current (AC-DC) conversion unit;

an acquisition unit;

a processing unit;

a power isolation unit; and a communication isolation unit, wherein an input terminal of the AC-DC conversion unit is connected to an alternating current power supply, and an output terminal of the AC-DC conversion unit is connected to an input terminal of the power isolation unit and a power terminal of the processing unit, for converting an alternating current to a direct current and inputting the direct current to the power isolation unit and the power terminal of the processing unit;

a sampling terminal of the acquisition unit is connected to the alternating current power supply for sampling the alternating current;

an output terminal of the power isolation unit is connected to a power terminal of the acquisition unit for isolating a current between the acquisition unit and the processing unit; and the communication isolation unit is connected between a communication terminal of the acquisition unit and a communication terminal of the processing unit for isolating a current when the acquisition unit and the processing unit are in communication, wherein the acquisition unit comprises an acquisition chip, a voltage divider resistor, a non-isolation current acquisition unit, and a sampling resistor, a terminal of the voltage divider resistor is connected to a phase line of the alternating current, and the other terminal of the voltage divider resistor is connected to a voltage acquisition terminal of the acquisition chip, for acquiring a voltage, and a terminal of the non-isolation current acquisition unit is connected to the phase line of the alternating current, another terminal of the non-isolation current acquisition unit is connected to a terminal of the sampling resistor, and the other terminal of the sampling resistor is connected to a current acquisition terminal of the acquisition chip, for acquiring a current.

11. The power acquisition apparatus according to claim 10, characterized in that the power isolation unit comprises a high-withstand voltage direct current-direct current (DC-DC) isolation transformer and a switching circuit, wherein the switching circuit is configured to generate a control signal based on an inputted switching signal; and a first input terminal of the high-withstand voltage DC-DC isolation transformer is connected to the output terminal of the AC-DC conversion unit, a second input terminal of the high-withstand voltage DC-DC isolation transformer is connected to an output terminal of the switching circuit, and an output terminal of the high-withstand voltage DC-DC isolation transformer is connected to a power terminal of the acquisition unit, for controlling the high-withstand voltage DC-DC isolation transformer based on the control signal outputted by the switching circuit to isolate the current between the acquisition unit and the processing unit.

12. The power acquisition apparatus according to claim 11, characterized in that the switching circuit comprises a first resistor, a second resistor, and a switching transistor, wherein a terminal of the first resistor serves as an input terminal of the switching circuit, and a second terminal of the first resistor is connected to a terminal of the second resistor and a base of the switching transistor;

the other terminal of the second resistor is connected to an emitter of the switching transistor and is grounded; and a collector of the switching transistor is connected to the second input terminal of the high-withstand voltage DC-DC isolation transformer.

13. The power acquisition apparatus according to claim 11, characterized in that the power isolation unit further comprises a voltage stabilizing circuit, wherein an input terminal of the voltage stabilizing circuit is connected to the output terminal of the high-withstand voltage DC-DC isolation transformer, and an output terminal of the voltage stabilizing circuit is connected to the power terminal of the acquisition unit, for stabilizing a direct current outputted by the high-withstand voltage DC-DC isolation transformer before inputting it to the power terminal of the acquisition unit.

14. The power acquisition apparatus according to claim 13, characterized in that the voltage stabilizing circuit comprises a diode, a first capacitor, a third resistor, a voltage stabilizing chip, a second capacitor, a first inductor, and a second inductor, wherein an anode of the diode is connected to a first output terminal of the high-withstand voltage DC-DC isolation transformer, and a cathode of the diode is connected to the first capacitor, the third resistor, and an input terminal of the voltage stabilizing chip;

an output terminal of the voltage stabilizing chip is connected to a terminal of the second capacitor and a terminal of the first inductor;

the other terminal of the first inductor is connected to the power terminal of the acquisition unit;

a second output terminal of the high-withstand voltage DC-DC isolation transformer is connected to the other terminal of the first capacitor, the other terminal of the third resistor, a ground terminal of the voltage stabilizing chip, the other terminal of the second capacitor, and a terminal of the second inductor; and the other terminal of the second inductor is grounded.

15. The power acquisition apparatus according to claim 10, characterized in that the communication isolation unit comprises an optocoupler and a driving circuit, wherein a first terminal of the optocoupler is connected to the communication terminal of the processing unit, and another terminal of the optocoupler is connected to the communication terminal of the acquisition unit;

the driving circuit is configured to drive the optocoupler to operate normally, based on a received trigger signal; and the optocoupler is configured, after operating normally, isolate the current when the acquisition unit and the processing unit are in communication.

16. The power acquisition apparatus according to claim 10, characterized in that the communication isolation unit comprises a communication isolation chip, wherein a terminal of the communication isolation chip is connected to the communication terminal of the processing unit, and another terminal of the communication isolation chip is connected to the communication terminal of the acquisition unit, wherein the terminal of the communication isolation chip and the another terminal of the communication isolation chip are located on different sides of an isolation zone of the communication isolation chip.

17. The power acquisition apparatus according to claim 10, characterized in that the power acquisition circuit further comprises a direct current-direct current (DC-DC) conversion circuit, wherein an input terminal of the DC-DC conversion circuit is connected to the output terminal of the AC-DC conversion unit, and an output terminal of the DC-DC conversion circuit is connected to the power terminal of the processing unit, for performing a voltage reduction processing on the direct current outputted from the AC-DC conversion unit to obtain a first direct current for which the voltage has been reduced.

18. The power acquisition apparatus according to claim 17, characterized in that the power isolation unit is further configured to:
control, by means of the switching circuit, the high-withstand voltage DC-DC isolation transformer to perform a voltage reduction processing on the direct current outputted from the AC-DC conversion unit to obtain a second direct current for which the voltage has been reduced.

* * * * *